United States Patent
Luxenhofer et al.

(10) Patent No.: US 12,139,579 B2
(45) Date of Patent: Nov. 12, 2024

(54) GEL-FORMING BLOCK COPOLYMERS

(71) Applicant: Julius-Maximilians-Universität Würzburg, Würzburg (DE)

(72) Inventors: Robert Luxenhofer, Würzburg (DE); Lukas Hahn, Würzburg (DE)

(73) Assignee: Julius-Maximilians-Universität Würzburg, Würzburg (DE)

( * ) Notice: Subject to any disclaimer, the term of this patent is extended or adjusted under 35 U.S.C. 154(b) by 853 days.

(21) Appl. No.: 17/012,377

(22) Filed: Sep. 4, 2020

(65) Prior Publication Data
US 2021/0087338 A1  Mar. 25, 2021
US 2023/0093774 A9  Mar. 23, 2023

(30) Foreign Application Priority Data

Sep. 9, 2019 (EP) ..................... 19196221

(51) Int. Cl.
*C08G 73/02* (2006.01)
*B29C 64/40* (2017.01)
(Continued)

(52) U.S. Cl.
CPC ............ *C08G 73/02* (2013.01); *B29C 64/40* (2017.08); *B33Y 10/00* (2014.12); *B33Y 70/00* (2014.12);
(Continued)

(58) Field of Classification Search
CPC .............. C08G 2210/00; C08G 73/0233; C08G 73/02; C08J 2379/02; C08J 3/075
See application file for complete search history.

(56) References Cited

U.S. PATENT DOCUMENTS

| | | | |
|---|---|---|---|
| 4,540,747 A | 9/1985 | Saegusa et al. | |
| 5,854,331 A * | 12/1998 | Ma ................... | C09D 11/326 524/505 |
| 2019/0153157 A1 | 5/2019 | Lorson et al. | |

OTHER PUBLICATIONS

Xie et al. Amphiphilic ABA triblock copolymers via combination of ROMP and ATRP in ionic liquid: Synthesis, characterization, and self-assembly; Reactive & Functional Polymers 2008, 68, 1601-1608 (Year: 2008).*

(Continued)

*Primary Examiner* — Heidi R Kelley
*Assistant Examiner* — Surbhi M Du
(74) *Attorney, Agent, or Firm* — Laine IP Oy; Mark W. Scott

(57) ABSTRACT

Provided is a block copolymer comprising a polymer block (A) formed from repeating units of formula (I):

(Continued)

wherein R¹ is methyl or ethyl,
and a polymer block (B) formed from repeating units of formula (II):

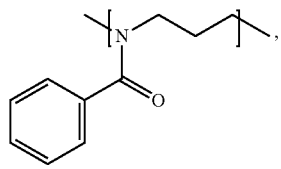

(II)

as well as a hydrogel comprising the block copolymer.

18 Claims, 4 Drawing Sheets

(51) Int. Cl.
 *B29K 105/00* (2006.01)
 *B29K 105/24* (2006.01)
 *B33Y 10/00* (2015.01)
 *B33Y 70/00* (2020.01)
 *C08J 3/075* (2006.01)
(52) U.S. Cl.
 CPC .......... *C08G 73/0233* (2013.01); *C08J 3/075* (2013.01); *B29K 2105/0085* (2013.01); *B29K 2105/24* (2013.01); *C08G 2210/00* (2013.01); *C08J 2379/02* (2013.01)

(56) References Cited

OTHER PUBLICATIONS

Bloksma et al. (Poly(cyclic imino ether)s Beyond 2-substituted-2-oxozolines, Macromol. Rapid Commun. 2011, 32, 1419-1441 (Year: 2011).*
Extended European Search Report for European Application No. 19196221.6, mailed Mar. 13, 2020 (9 pages).
Kobayashi et al., "Block Copolymer from Cyclic Imino Ethers: A New Class of Nonionic Polymer Surfactant", Macromolecules, vol. 19, No. 15, pp. 535-541, 1986, (8 pages).

* cited by examiner

GEL-FORMING BLOCK COPOLYMERS

CROSS-REFERENCE TO RELATED APPLICATIONS

This application claims priority from European Patent Application serial number 19 19 6221.6, filed Sep. 9, 2019, titled "Gel-Forming Block Copolymers," the disclosure of which is incorporated herein by reference in its entirety.

Thermoresponsive polymers are widely discussed and described in the literature, e.g. Y.-J. Kim and Y. Matsunaga, "Thermo-responsive polymers and their application as smart biomaterials", J. Mater. Chem. B, 2017, 5, 4307-4321. Some of these thermoresponsive structures undergo reversible temperature dependent gelation in aqueous solutions, like gelatin. Depending on the applications, the temperature and conditions at which the gel forms and is stable must be suitable. Also the strength of the gel must be adapted to the desired application. It was the objective underlying the invention to provide such a thermoresponsive polymer, which is capable of forming a gel structure within an appropriate temperature range, and with a suitable gel strength.

It has been found that a new block copolymer platform based on poly(2-oxazoline)-bock-poly(2-oxazine)s as described in the following is able to undergo inverse thermogelation from aqueous solutions with a low polymer concentration. The hydrogels, which are formed when the solutions of the block copolymers disclosed herein are kept below a critical temperature, show a number of beneficial properties, such as shear-thinning and structure recovery properties. The gel formation is reversible, and once the gel is formed, it stays stable until heated to an upper critical temperature. At this upper critical temperature, the gel liquefies. Moreover, the gel strength can be adjusted by appropriately selecting the concentration of the block copolymer.

Thus, in accordance with a first aspect of the present invention, the invention provides a block copolymer comprising
a polymer block (A) formed from repeating units of formula (I):

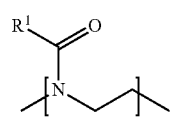

(I)

wherein $R^1$ is methyl or ethyl,
and
a polymer block (B) formed from repeating units of formula (II):

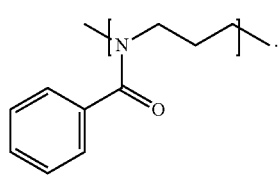

(II)

In accordance with further related aspects, the invention provides a hydrogel comprising the block copolymer of the present invention, and a process for the formation of such a hydrogel.

The block copolymer in accordance with the present invention comprises a polymer block (A) formed from repeating units of formula (I):

(I)

wherein $R^1$ is methyl or ethyl, preferably methyl.

In line with conventional practice, it will be understood that the brackets [ ] in formula (I) indicate that the entity within the brackets (i.e. —N(C(O)$R^1$)—CH$_2$—CH$_2$—) represents a repeating unit of the polymer block, and the lines crossing the brackets indicate the bonds which link the repeating unit to adjacent atoms or entities, typically to an adjacent repeating unit of the same polymer block, to an adjacent repeating unit of a different polymer block, or to a terminal group of the block copolymer. The reference to a polymer block "formed from" a defined repeating unit or a group of repeating units indicates that the polymer block consists of the respective units.

Preferably, $R^1$ is the same for all repeating units within each polymer block (A). Likewise, it is preferred that all repeating units within a polymer block (A) are the same, and if more than one polymer block (A) is present, the polymer blocks are also formed from the same repeating unit of formula (I).

The number of repeating units of formula (I) forming each polymer block (A) is, independently for each polymer block (A) if more than one polymer block (A) is present, preferably 5 or more and 100 or less, more preferably 10 or more and 70 or less, and even more preferably 20 or more and 50 or less.

In line with the above, a preferred structure of the polymer block(s) (A) is indicated by the following formula (Ia):

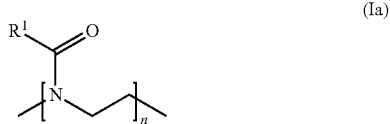

(Ia)

wherein $R^1$ is methyl or ethyl, more preferably methyl, and n is 5 or more and 100 or less, more preferably 10 or more and 70 or less, and even more preferably 20 or more and 50 or less.

The polymer block(s) (B) comprised by the block copolymer in accordance with the present invention are formed from repeating units of formula (II):

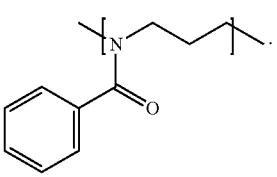

(II)

In line with conventional practice, it will be understood that the brackets [ ] in formula (II) indicate that the entity within the brackets (i.e. —N(C(O)Ph)-CH$_2$—CH$_2$—CH$_2$—) represents a repeating unit of the polymer block, and the lines crossing the brackets indicate the bonds which link the repeating unit to adjacent atoms or entities, typically to an adjacent repeating unit of the same polymer block, to an adjacent repeating unit of a different polymer block, or to a terminal group of the block copolymer. The reference to a polymer block "formed from" a defined repeating unit or a group of repeating units indicates that the polymer block consists of the respective units.

The number of repeating units of formula (II) forming each polymer block (B) is, independently for each polymer block (B) if more than one polymer block (B) is present, preferably 5 or more and 100 or less, more preferably 5 or more and 70 or less, and even more preferably 10 or more and 33 or less.

In line with the above, a preferred structure of the polymer block(s) (B) is indicated by the following formula (IIa):

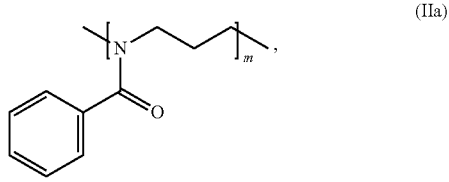

wherein m is 5 or more and 100 or less, more preferably 5 or more and 70 or less, and even more preferably 10 or more and 33 or less.

The term "block copolymer" is used herein in accordance with its established meaning in the art to refer to copolymers wherein repeating units of a defined type are organized in blocks. Typically, the block (A) or blocks (A) contained in the block copolymer in accordance with the invention can be considered as polymers themselves, and the same applies for the block (B) or the blocks (B). Thus, reference may be made herein to a "polymer A" providing the polymer block(s) (A), and to a "polymer B" providing the polymer block(s) (B) in the copolymer in accordance with the invention.

The block copolymer according to the invention comprises a polymer block (A) and a polymer block (B) as defined herein. It can comprise other repeating units and/or other polymer blocks in addition to the polymer block(s) (A) and the polymer block(s) (B). However, typically all of the repeating units contained in the block copolymer are the repeating units forming the polymer block(s) (A) and the polymer block(s) (B) as defined above. Thus, preferably, the polymeric entities of the block copolymer consist of one or more polymer block(s) (A) and one or more polymer block(s) (B). It will be understood that such a block copolymer, wherein the polymeric entities consist of one or more polymer block(s) (A) and one or more polymer block(s) (B), can comprise, in addition to the polymer blocks (A) and (B), groups which are not repeating units, e.g. terminal groups originating from a polymerization initiator or from a terminating agent.

The block copolymer in accordance with the present invention typically has a structure selected from a linear block copolymer, a star-like block copolymer, and a block copolymer with a graft structure or a brush copolymer. More preferred is a linear block copolymer structure. As will be understood by the skilled reader, in such a linear structure, there are either two polymer blocks (A)-(B) or (B)-(A), three polymer blocks (A)-(B)-(A) or (B)-(A)-(B), or more polymer blocks (A) and (B) linearly arranged in an alternating fashion. Among these linear block copolymers, preference is given to a diblock copolymer (A)-(B) or (B)-(A), and to a triblock copolymer (A)-(B)-(A). Most preferred is the triblock copolymer having the structure (A)-(B)-(A), i.e. a triblock copolymer comprising two polymer blocks (A) and one polymer block (B) in the order of (A)-(B)-(A).

If more than one polymer block (A) is present in the block copolymer in accordance with the present invention, it is preferred that the polymer blocks (A) contain similar numbers of repeating units, e.g. if the average number of repeating units is calculated, the number of repeating units in all polymer blocks (A) is within the range of the average number of repeating units±50%, more preferably within the range of the average number of repeating units±25%.

If more than one polymer block (B) is present in the block copolymer in accordance with the present invention, it is preferred that the polymer blocks (B) contain similar numbers of repeating units, e.g. if the average number of repeating units is calculated, the number of repeating units in all polymer blocks (B) is within the range of the average number of repeating units±50%, more preferably within the range of the average number of repeating units±25%.

The ratio of the total number of repeating units of formula (I) forming the polymer block(s) (A) to the total number of repeating units of formula (II) forming the polymer block(s) (B) in any block copolymer in accordance with the invention, in terms of the numbers of repeating units, is preferably in the range of 20:1 to 1:1, more preferably 16:1 to 2:1, and even more preferably 8:1 to 3:1. This ratio can be determined, e.g., by measuring the relative amounts of side chains $R^1$ and phenyl side chains via $^1$H-NMR analysis and calculating their ratio accordingly.

The average degree of polymerization (number average) of the block copolymer in accordance with the present invention is preferably in the range of 40 to 180, more preferably in the range of 60 to 110, indicated as the average number of repeating units. It can be determined, e.g., via NMR endgroup analysis.

As apparent from the above, a strongly preferred block copolymer in accordance with the invention is an (A)-(B)-(A) triblock copolymer having the following structure (III):

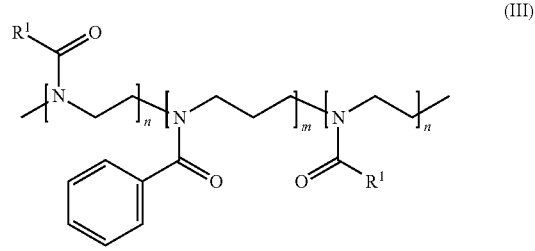

wherein $R^1$ is methyl or ethyl, more preferably methyl, n is, independently, 5 or more and 100 or less, more preferably 10 or more and 70 or less, and even more preferably 20 or more and 50 or less, and m is 5 or more and 100 or less, more preferably 5 or more and 70 or less, and even more preferably 10 or more and 33 or less.

As regards the ratio of the total of n to m in the block copolymer of formula (III), it is equally preferred that this ratio ranges from 20:1 to 1:1, more preferably from 16:1 to 2:1, and even more preferably from 8:1 to 3:1.

Also for the block copolymer of formula (III), the average degree of polymerization (number average) is preferably in the range of 40 to 180, more preferably in the range of 60 to 110.

In line with conventional practice, formula (III) shows that the polymeric entities of the block copolymer of formula (III) consists of the three polymer blocks, the first one being formed by n repeating units of the formula —N(C(O)R$^1$)—CH$_2$—CH$_2$—, the second one being formed by m repeating units of the formula —N(C(O)Ph)-CH$_2$—CH$_2$—CH$_2$—, and the third one being formed by n repeating units of the formula —N(C(O)R$^1$)—CH$_2$—CH$_2$—.

As will be understood by the skilled person, the open bonds at the polymer terminals on the left side and on the right side of formula (III) will typically be attached to groups which are not repeating units, i.e. terminal groups of the block copolymer, such as groups originating from a polymerization initiator or from a terminating agent, or a group or atom contained in a monomer terminating a polymer block, such as a hydrogen atom, a methyl group, a propargyl group, or a tert-butyl piperazinyl-1-carboxylate (1-Boc-piperazinyl) group.

The block copolymers of the present invention can be prepared by polymerization methods known in the art, the polymer synthesis is well reproducible and scalable. For example, a polymer block (B) can be conveniently prepared via cationic ring-opening polymerization of 2-phenyl substituted 2-oxazines (also referred to as 2-phenyl substituted 5,6-dihydro-4H-1,3-oxazines) of the formula

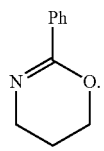

Such 2-oxazine monomers are obtainable, e.g., from a suitable nitrile, 3-aminopropanol and zinc acetate as a catalyst, following the procedure by Seeliger et al. (H. Witte, W. Seeliger, Justus Liebigs Annalen der Chemie 1974, 996-1009).

Likewise, 2-substituted 2-oxazolines of the following formula, wherein R$^1$ has the same meaning as above, can be polymerized via ring-opening polymerization to provide a polymer block (A):

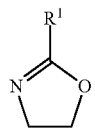

Suitable conditions for the cationic ring opening polymerization of 2-substituted 2-oxazine or 2-substituted 2-oxazoline monomers are disclosed, e.g., by R. Luxenhofer and R. Jordan, Macromolecules 39, 3509-3516 (2006), T. Bonne et al., Colloid. Polym. Sci., 282, 833-843 (2004), T. Bonne et al. Macromol. Chem. Phys. 2008, 1402-1408, (2007), or L. Hahn et al., Biomacromolecules 2018, 19, 7, 3119-3128.

As will be understood by the skilled person, the molar mass or degree of polymerization of the block copolymer in accordance with the invention can be controlled, e.g., by controlling the ratio of the amount of a polymerization initiator to the amount of monomers.

It has been found by the present inventors that the block copolymers in accordance with the invention are able to form a hydrogel, and that the formation of this hydrogel is reversible. Thus, as a further aspect, a hydrogel is provided which comprises a block copolymer of the present invention. As will be understood by the skilled person, the block copolymer is comprised within the polymer network of this hydrogel, and preferably the polymer network of the hydrogel consists of the block copolymer of the present invention. Without wishing to be bound by theory, it is assumed that the macromolecules of the block copolymer form a network via non-covalent interactions of their polymer chains or of blocks contained therein, respectively. It will be further understood that the hydrogel can comprise one or more types of the block copolymer in accordance with the invention. If more than one type of such a copolymer is used, the types of block copolymer may differ, e.g., with respect to the degree of polymerization of one or more of the polymer blocks contained therein.

The hydrogel in accordance with the invention can be conveniently formed using an aqueous solution of the block copolymer in accordance with the invention. As will be understood by the skilled reader, and aqueous solution is a solution comprising water as a solvent, typically as a main solvent in an amount of 50 wt % or more (based on the total weight of solvent as 100%) preferably in an amount of 75 wt % or more and more preferably in an amount of 90 wt % or more. Most preferably, the aqueous solution uses water as the only solvent.

The block copolymers of the present invention are thermoresponsive and capable of forming a hydrogel from aqueous solutions of comparably low polymer concentrations. Typical concentrations of the block copolymer in the aqueous solutions which can be used to provide such a hydrogel range from 3 wt % to 40 wt %, and preferred concentrations from 5 wt % to 30 wt %, based on the total weight of the solution as 100 wt %. The inventors have found that the gel strength of the obtained hydrogel can be adjusted by adjusting the concentration of the block copolymer in the aqueous solution, with higher concentrations leading to a higher gel strength. In order to provide such a solution, the block copolymer can be dissolved in an appropriate amount of water. As will be understood by the skilled person, the solution is preferably be prepared using an aqueous solvent or a mixture of the aqueous solvent and the block copolymer with a temperature at or above the upper critical temperature where the gel liquefies, i.e. at or above a temperature which is typically in the range of 27 to 35° C. for the block copolymers in accordance with the present invention.

In order to allow the formation of a hydrogel, it is sufficient to keep the aqueous solution of the block copolymer at a temperature which allows the gelation to proceed, i.e. a temperature which lies below the critical temperature at which the hydrogel liquefies. This can be conveniently accomplished e.g. by cooling the aqueous solution. Thus, a further aspect of the present invention relates to a process for the formation of a hydrogel, comprising the step of cooling an aqueous solution of a block copolymer in accordance with the invention. Typically, the aqueous solution is kept for this purpose at a temperature of 20° C. or less. In order to accelerate the formation of the gel, it is preferred to keep the aqueous solution at a temperature of 15° C. or less, more preferably 10° C. or less, e.g. 5 to 10° C. The temperature at which the solution is kept to allow the formation of the hydrogel is typically not lower than 0° C.

Once the hydrogel has formed, it remains stable until it is exposed to a temperature at or above the upper critical temperature. At temperatures at or above the upper critical temperature, the hydrogel turns again into a liquid aqueous solution (a process which may also be referred to as the liquefication of the hydrogel). The upper critical temperature is typically in the range of 27 to 35° C. The process of gelation and dissolution of the hydrogel can be repeated without limitations.

The hydrogel in accordance with the present invention is optically transparent. As noted above, its gel strength can be adjusted across a broad range in a simple procedure, and it can be obtained from solutions of low polymer concentration. Furthermore, it has been found that the hydrogel in accordance with the invention has shear-thinning properties.

Due to the favorable properties discussed above, the hydrogel in accordance with the present invention can be used in a variety of applications, including e.g. the use as support material in 3D printing, or the use as a matrix for the transport of a sensitive material such as of biological material.

The aspects of the present invention as described above are further summarized and explained in the following items.

1. A block copolymer comprising
a polymer block (A) formed from repeating units of formula (I):

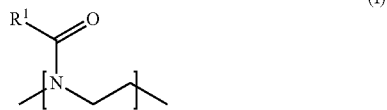

wherein $R^1$ is methyl or ethyl, and
a polymer block (B) formed from repeating units of formula (II):

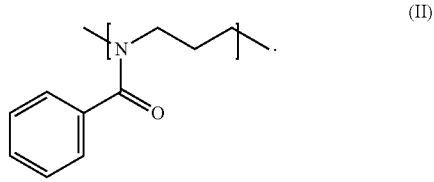

2. The block copolymer in accordance with item 1, wherein $R^1$ is methyl.

3. The block copolymer in accordance with item 1 or 2, wherein the number of repeating units of formula (I) forming each polymer block (A) is, independently for each polymer block (A) if more than one polymer block (A) is present, 5 or more and 100 or less.

4. The block copolymer in accordance with item 3, wherein the number of repeating units of formula (I) forming each polymer block (A) is, independently for each polymer block (A) if more than one polymer block (A) is present, 10 or more and 70 or less.

5. The block copolymer in accordance with item 4, wherein the number of repeating units of formula (I) forming each polymer block (A) is, independently for each polymer block (A) if more than one polymer block (A) is present, 20 or more and 50 or less.

6. The block copolymer in accordance with item 1 or item 2, wherein the structure of the polymer block (A) is represented by formula (Ia):

wherein $R^1$ is as defined in item 1 or 2, and n is 5 or more and 100 or less.

7. The block copolymer in accordance with item 6, wherein n is 10 or more and 70 or less.

8. The block copolymer in accordance with item 7, wherein n is 20 or more and 50 or less.

9. The block copolymer in accordance with any of items 1 to 8, wherein the number of repeating units of formula (II) forming each polymer block (B) is, independently for each polymer block (B) if more than one polymer block (B) is present, 5 or more and 100 or less.

10. The block copolymer in accordance with item 9, wherein the number of repeating units of formula (II) forming each polymer block (B) is, independently for each polymer block (B) if more than one polymer block (B) is present, 5 or more and 70 or less.

11. The block copolymer in accordance with item 10, wherein the number of repeating units of formula (II) forming each polymer block (B) is, independently for each polymer block (B) if more than one polymer block (B) is present, 10 or more and 33 or less.

12. The block copolymer in accordance with any of items 1 to 8, wherein the structure of the polymer block (B) is represented by formula (IIa):

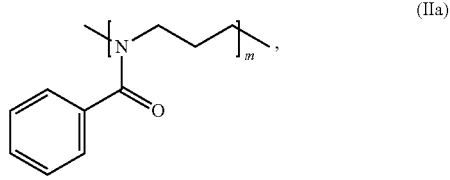

wherein m is 5 or more and 100 or less.

13. The block copolymer in accordance with item 12, wherein m is 5 or more and 70 or less.

14. The block copolymer in accordance with item 13, wherein m is 10 or more and 33 or less.

15. The block copolymer in accordance with any of items 1 to 14, which is a triblock copolymer having the structure (A)-(B)-(A).

16. The block copolymer in accordance with any of items 1 to 15, wherein the ratio of the total number of repeating units of formula (I) forming the polymer block(s) (A) to the total number of repeating units of formula (II) forming the polymer block(s) (B) in terms of the numbers of repeating units, is in the range of 20:1 to 1:1.

17. The block copolymer in accordance with item 16, wherein the ratio of the total number of repeating units of formula (I) forming the polymer block(s) (A) to the total number of repeating units of formula (II) forming the polymer block(s) (B) in terms of the numbers of repeating units, is in the range of 16:1 to 2:1.

18. The block copolymer in accordance item 17, wherein the ratio of the total number of repeating units of formula (I) forming the polymer block(s) (A) to the total number of repeating units of formula (II) forming the polymer block(s) (B) in terms of the numbers of repeating units, is in the range of 8:1 to 3:1.

19. The block copolymer in accordance with any of items 1 to 18, wherein the number average degree of polymerization of the block copolymer is in the range of 40 to 180.

20. The block copolymer in accordance with item 19, wherein the number average degree of polymerization is in the range of 60 to 110.

21. The block copolymer in accordance with any of items 1, 2, 6 to 8, 12 to 14 and 16 to 20, wherein the block copolymer is a triblock copolymer having the following structure (Ill):

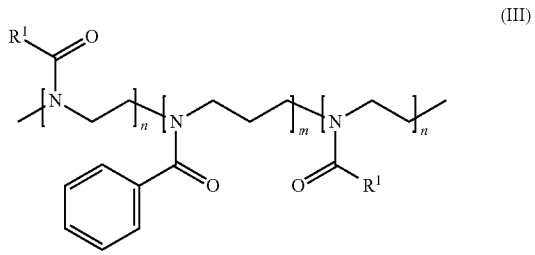

(III)

wherein $R^1$ is defined as in item 1 or 2, n is defined as in items 6, 7 or 8, and m is defined as in items 12, 13 or 14.

22. A hydrogel comprising the block copolymer in accordance with any of items 1 to 21.

23. A process for the formation of a hydrogel, comprising the step of keeping an aqueous solution of the block copolymer in accordance with any of items 1 to 21 at a temperature of 20° C. or less.

24. The process in accordance with item 23, wherein the aqueous solution of the block copolymer is kept at a temperature of 15° C. or less.

25. The process in accordance with item 24, wherein the aqueous solution of the block copolymer is kept at a temperature of 10° C. or less.

26. The process in accordance with item 24 or 25, wherein the aqueous solution of the block copolymer is kept at a temperature of not lower than 0° C.

27. The process in accordance with any of items 23 to 26, wherein the aqueous solution comprises the block copolymer at a concentration of 3 wt % to 40 wt %, based on the total weight of the solution as 100 wt %.

28. The process in accordance with item 27, wherein the aqueous solution comprises the block copolymer at a concentration of 5 wt % to 30 wt %, based on the total weight of the solution as 100 wt %.

29. A hydrogel, obtainable by the process in accordance with any of items 23 to 28.

30. Use of the block copolymer in accordance with any of items 1 to 22 or of the hydrogel in accordance with items 23 or 29 as support material in 3D printing or as a matrix for the transport of a sensitive material.

EXAMPLES

General Synthesis of a Block-Copolymer:
Under dry and inert conditions, initiator and 2-methyl-2-oxazoline (MeOx) were added to dry benzonitrile (PhCN) and stirred for several hours at 110° C. The full monomer conversion was verified by $^1$H-NMR-spectroscopy before adding the monomer for the second block. The mixture was cooled to room temperature and 2-phenyl-2-oxazine (PheOzi) was added. After stirring at 120° C. overnight the monomer (MeOx) for the third block was added. After completion of the third block, termination was carried out using the respective terminating agent and stirring for several hours at 45° C. After cooling to room temperature, potassium carbonate was added and the mixture was stirred for 5 hours. The solvent was removed at reduced pressure and the flask was placed in a vacuum drying oven at 40° C. and 20 mbar for 2 days. The product was dissolved in deionized water, dialyzed overnight using a membrane with a MWCO of 1 kDa and freeze-dried. FIG. 1 illustrates the structure of the resulting block copolymer, wherein m and n have the meanings defined above.

The polymers are characterized via NMR, size exclusion chromatography and rheology.

Description of NMR and GPC:
Nuclear Magnetic Resonance Spectroscopy (NMR)
NMR spectra were recorded on a Fourier 300 (300.12 MHz), Bruker Biospin (Rheinstetten, Germany) at 298 K. The spectra were calibrated to the signal of residual protonated solvent (CDCl$_3$ at 7.26 ppm).

Gel Permeation Chromatography (GPC)
Gel permeation chromatography (GPC) was performed on an Agilent 1260 Infinity System, Polymer Standard Service (Mainz, Germany) with HFIP containing 3 g/L potassium trifluoroacetate as eluent; precolumn: 50×8 mm PSS PFG linear M; 2 columns: 300×8 mm PSS PFG linear M (particle size 7 μm; pore size 0.1-1,000 kg/mol). The columns were kept at 40° C. and flow rate was 0.7 mL/min. Prior to each measurement, samples were filtered through 0.2 μm PTFE filters, Roth (Karlsruhe, Germany). Conventional calibration was performed with PEG standards (0.1-1,000 kg/mol) and data was processed with WinGPC software.

Results from NMR and GPC analysis of different block copolymers (A: MeOx 35 blocks containing 35 repeating units derived from MeOx) are shown in the following Table 1. The ratio of blocks A and B can be determined in an appropriate non-selective solvent by comparing the signals of appropriate side chain signals of block A and block B. Endgroup analysis for the determination of the average degree of polymerization can be conducted after appropriate base line correction using the signal of initiator or termination fragment in relation to the signal of the polymer backbone or an appropriate polymer side chain signal. Alternatively, or in addition, this can be conducted in a solvent selective from one block, for example block A. The average degree of polymerization of block A can then be obtained by endgroup analysis, whereby the overall average degree of polymerization can be obtained by considering the molar ratio of block A and block B.

TABLE 1

Number average molar mass, ratio of oxazine/
oxazoline (Ozi/Ox) units, dispersity Đ and yield of
the synthesized triblock copolymers used in this study.

| Polymer | $M_n^a$ [kg/mol] | Ozi/Ox ratio $^b$ | $M_n^c$ [kg/mol] | Đ | yield [%] |
|---|---|---|---|---|---|
| A-PPheOzi$_{15}$-A (B1) | 8.7 | 1:3.9 | 3.7 | 1.22 | 89 |
| A-PPheOzi$_{15}$-A (B2) | 8.6 | 1:4.1 | 3.8 | 1.28 | 83 |
| A-PPheOzi$_{15}$-A (B3) | 8.7 | 1:3.9 | 2.8 | 1.23 | 81 |

TABLE 1-continued

Number average molar mass, ratio of oxazine/
oxazoline (Ozi/Ox) units, dispersity Đ and yield of
the synthesized triblock copolymers used in this study.

| Polymer | $M_n{}^a$ [kg/mol] | Ozi/Ox ratio [b] | $M_n{}^c$ [kg/mol] | Đ | yield [%] |
|---|---|---|---|---|---|
| A-PPheOzi$_{15}$-A (B4) | 8.7 | /1:3.9 | 2.3 | 1.30 | 89 |
| A-PPheOzi$_5$-A | 7.0 | 1:14 | 4.0 | 1.29 | 70 |
| A-PPheOzi$_{30}$-A | 10.9 | 1:2.2 | 4.0 | 1.26 | 79 |

[a] Values obtained theoretical by $[M]_0/[I]_0$.
[b] Values calculated from $^1$H-NMR side chain analysis (PPheOzi/PMeOx).
[c] Obtained from GPC (T = 40° C., 0.7 mL/min (HFIP), poly(ethylene glycol) standards).
[d] Obtained from GPC by using $M_w/M_n$).

Rheology Method Description

Rheology experiments were performed using an Anton Paar (Ostfildern, Germany) Physica MCR 301 system utilizing a plate-plate geometry (25 mm diameter) equipped with a solvent trap and Peltier element. All aqueous samples were stored after dissolving for 48 h at 5° C.

The temperature-sweep was performed in oscillation mode from 5-50° C. (Heat-rate: 0.05° C./s), using a fixed amplitude of 0.1% and angular frequency of 10 rad/s. The long-time gelation experiment was performed at an amplitude of 0.1% and an angular frequency of 1 rad/s for several hours. To investigate the viscoelastic properties the linear viscoelastic region (LVR) was obtained by performing amplitude sweeps at different concentrations (5-40 wt. %) from 0.01% to 500% strain deformation and a fixed angular frequency of 10 rad/s at 5° C. For steady shear experiments, the control shear rate mode was used from 0.01 to 10 1/s at 5° C./s.

FIG. 2 shows amplitude-sweeps of block copolymer B1 (cf. Table 1) of different concentrations (5 wt. %: storage modulus G': filled squares, loss modulus G": filled circles; 10 wt. %: G': empty squares, G": empty circles; 15 wt. %: G': filled triangle up, G": filled triangle down and 20 wt. %: G': empty triangle up, G": empty triangle down) at 5° C. and an angular frequency of 10 rad/s.

FIG. 3 illustrates a temperature-sweep of block copolymer B1 from 5 to 50° C. with a 15 wt. % aqueous polymer solution, Amplitude 1%, angular frequency 10 rad/s. Storage modulus is shown by squares, loss modulus by circles. At 27° C. the structure undergoes first changes and at 30° C. the structure dissolves In FIG. 4, the gelation kinetics of block copolymer B1 at 5° C. of a 15 wt. % aqueous polymer solution are shown. Amplitude 1%, angular frequency 10 rad/s. Storage modulus is shown by squares, loss modulus by circles. The reorganization of the hydrogel takes place in a time frame of 100 minutes.

FIG. 5 shows the viscosity of hydrogels of block copolymer B1 in dependency of applied shear rate and different polymer concentrations at 5° C.

3D Printing Experiments

In order to demonstrate the suitability of the hydrogels in accordance with the invention as materials for 3D printing, scaffolds using 10, 15, and 20 wt % of A-PPheOzi$_{15}$-A and 20 wt % of A-PPheOzi$_{30}$-A hydrogels in water were printed using a 3D bioprinter equipped with a conical nozzle with 0.25 mm inner diameter for the extrusion of the hydrogel. A four-layer 10×10 line wood-pile structure was first printed. The strength of a 10 wt % A-PPheOzi15-A hydrogel was low and strand fusion was observed, which is in line with the yield point of the system. Nevertheless, a 3D cube could be printed. Also, the 20 wt % A-PPheOzi$_{30}$-A hydrogel could be successfully printed in 24 layers, but again some strand fusion was observed and shape fidelity was limited. Using the 20 wt % and 15 wt % hydrogels of A-PPheOzi$_{15}$-A at a printing speed of 600 mm/min, 24-layer constructs of 10×10 lines, 1 mm strand distance and 0.25 mm layer height could be conveniently printed. Excellent shape fidelity and layer integrity were obtained.

FIG. 6 shows the results for the dispense printing of the 20 wt % A-PPheOzi$_{15}$-A hydrogels (Block Copolymer B1, cf. Table 1; extrusion-based printing setup, conical nozzle with 0.25 mm inner diameters; speed: 600 mm/min); (A): printed 24-layer scaffold (dimensions: 10×10 mm; 1 mm strand distance; 0.25 mm layer height); (B): Light microscopy image of (A) (Top view).

To highlight the potential of the hydrogels as, e.g., a sacrificial matrix material or component in a hybrid system, the temperature was increased on the previously printed scaffolds, upon which strand fusion and collapse of the hydrogel network were observed and the gel liquefied rapidly. Accordingly, a mild temperature stimulus compatible with cell culture conditions can be used to remove scaffolds printed with the hydrogels in accordance with the invention. This can be very useful if used as a sacrificial support matrix to assist in printing of materials, which by themselves are not easily 3D printed with good shape fidelity.

Figure 1:
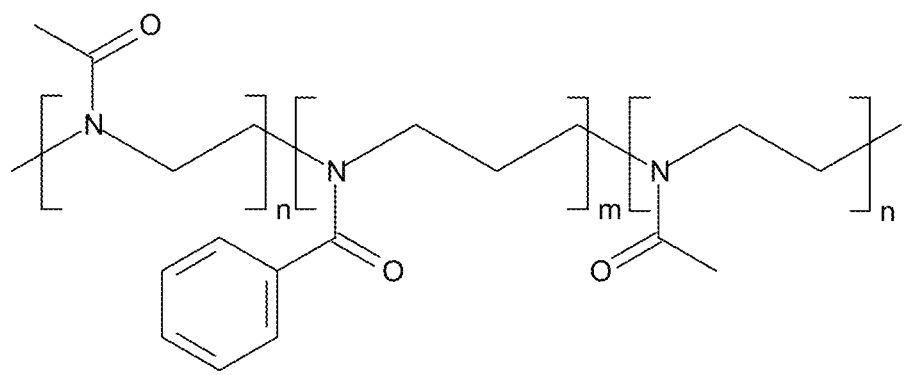
FIG. 1 illustrates an exemplary structure of a block-copolymer in accordance with the invention.
Figure 2:
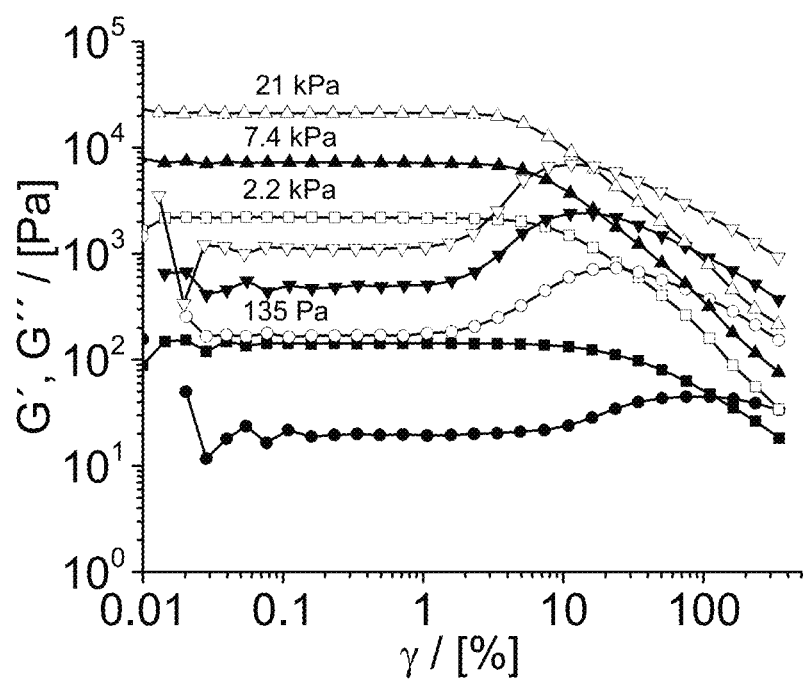
FIG. 2 shows amplitude-sweeps of block copolymer B1 (cf. Table 1) of different concentrations (5 wt. %: storage modulus G': filled squares, loss modulus G": filled circles; 10 wt. %: G': empty squares, G": empty circles; 15 wt. %: G': filled triangle up, G": filled triangle down and 20 wt. %: G': empty triangle up, G": empty triangle down) at 5° C. and an angular frequency of 10 rad/s.
Figure 3:
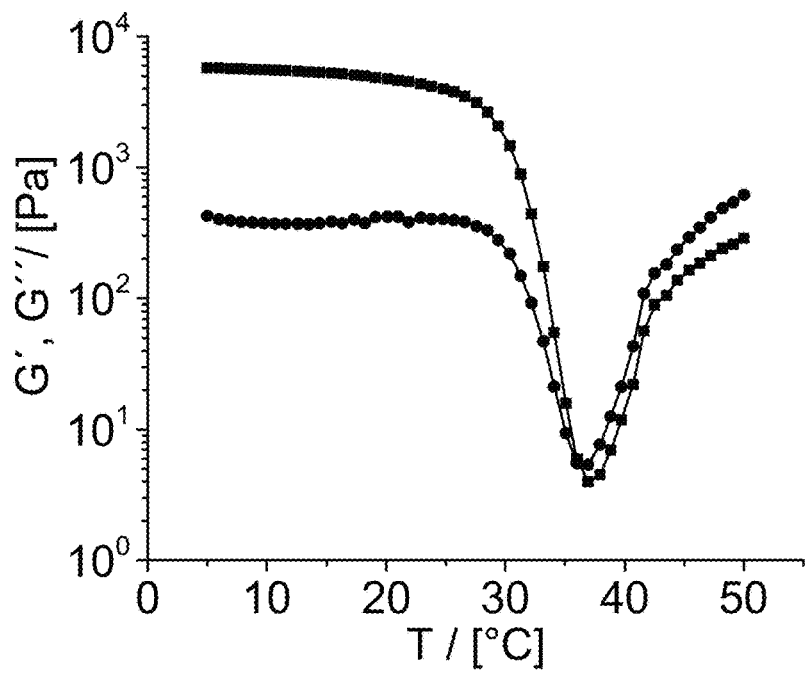
FIG. 3 illustrates a temperature-sweep of block copolymer B1 from 5 to 50° C. with a 15 wt. % aqueous polymer solution, Amplitude 1%, angular frequency 10 rad/s. Storage modulus is shown by squares, loss modulus by circles. At 27° C. the structure undergoes first changes and at 30° C. the structure dissolves.
Figure 4:
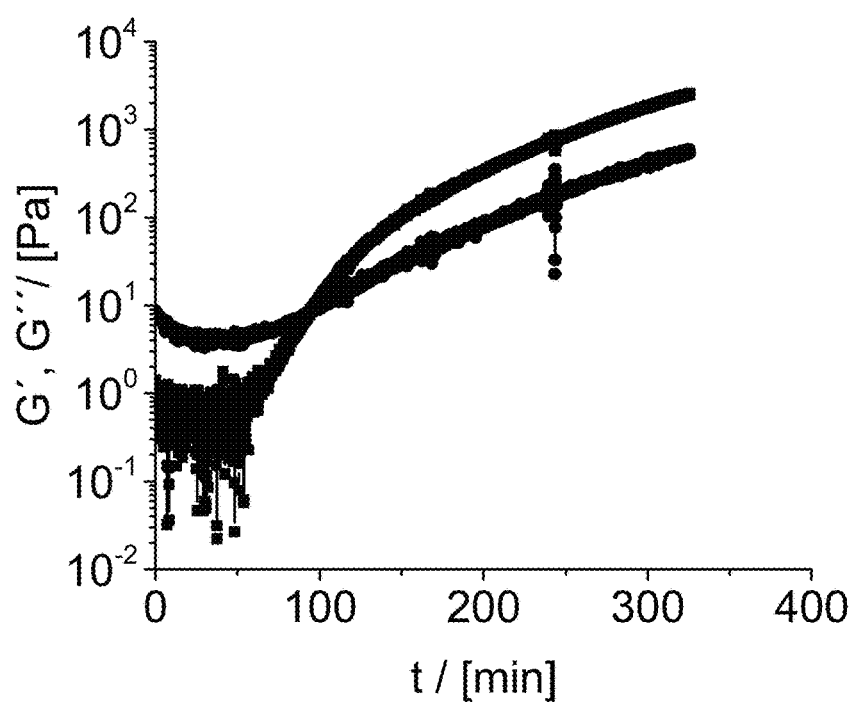
In FIG. 4, the gelation kinetics of block copolymer B1 at 5° C. of a 15 wt. % aqueous polymer solution are shown. Amplitude 1%, angular frequency 10 rad/s. Storage modulus is shown by squares, loss modulus by circles. The reorganization of the hydrogel takes place in a time frame of 100 minutes.
Figure 5:
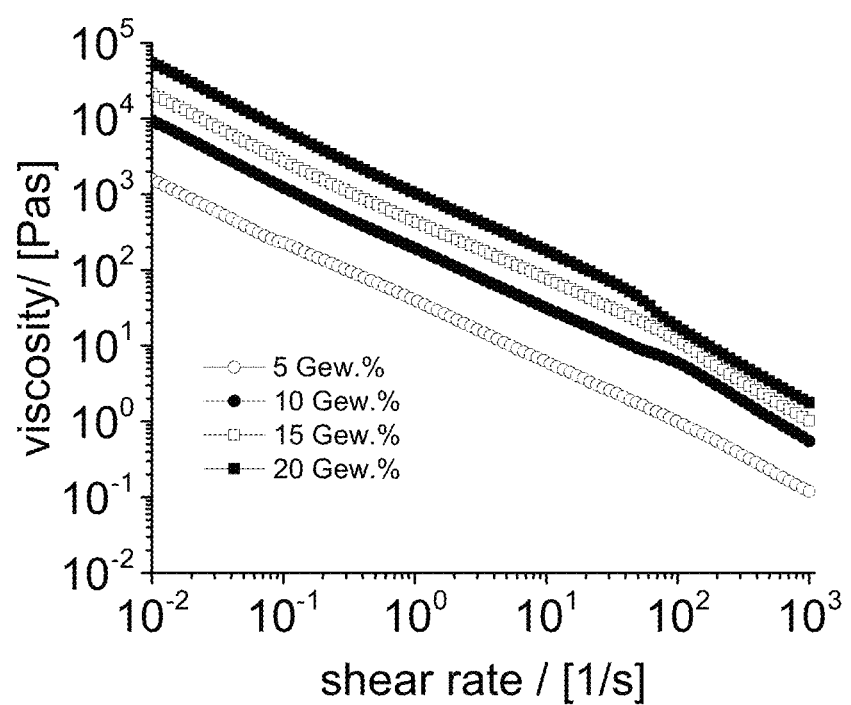
FIG. 5 shows the viscosity of hydrogels of block copolymer B1 in dependency of applied shear rate and different polymer concentrations at 5° C.
Figure 6:
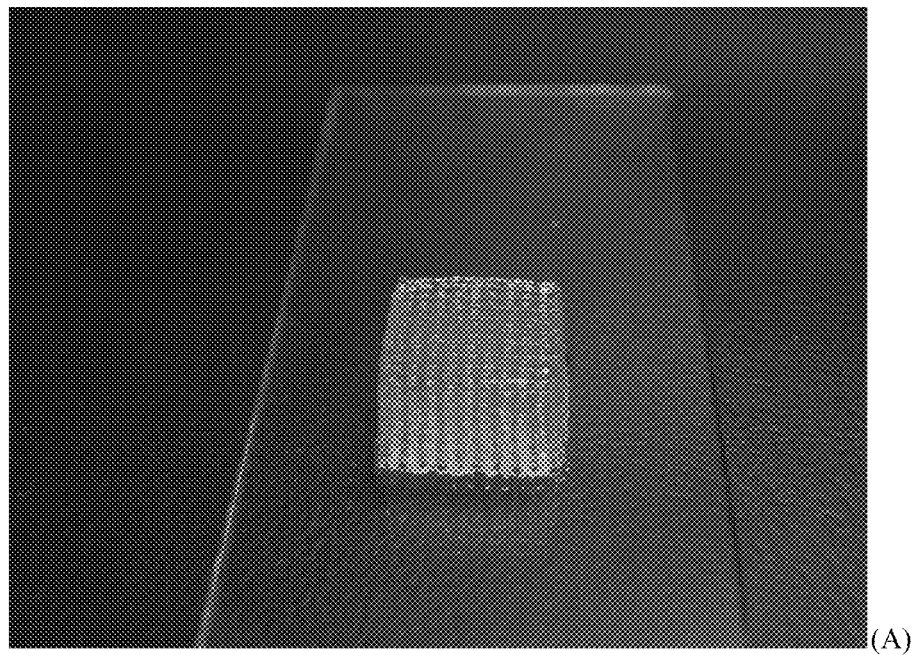
FIG. 6 shows the results for the dispense printing of the 20 wt % A-PPheOzi$_{15}$-A hydrogels (Block Copolymer B1, cf. Table 1; extrusion-based printing setup, conical nozzle with 0.25 mm inner diameters; speed: 600 mm/min); (A): printed 24-layer scaffold (dimensions: 10×10 mm; 1 mm strand distance; 0.25 mm layer height); (B): Light microscopy image of (A) (Top view).
Figure 6:
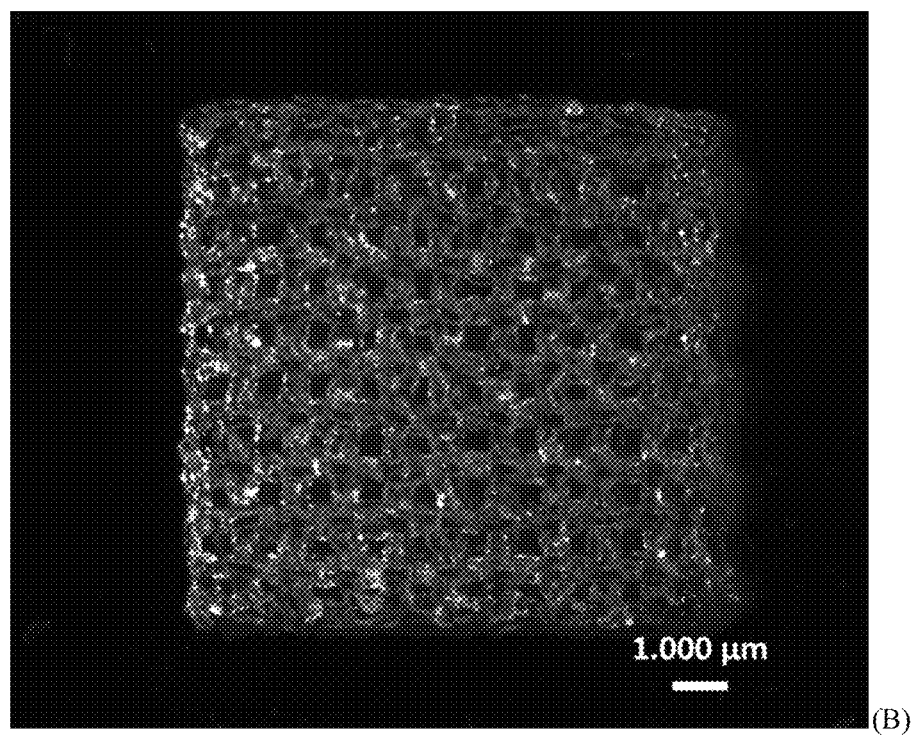

The invention claimed is:

1. An inverse gelling hydrogel comprising a block copolymer comprising
   a polymer block (A) formed from repeating units of formula (I):

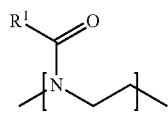

(I)

wherein R¹ is methyl or ethyl, and
a polymer block (B) formed from repeating units of formula (II):

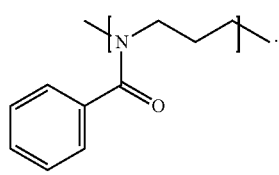

(II)

wherein the hydrogel is in gel form below a critical temperature.

2. The inverse gelling hydrogel in accordance with claim 1, wherein R¹ is methyl.

3. The inverse gelling hydrogel in accordance with claim 1, wherein the number of repeating units of formula (I) forming each polymer block (A) is, independently for each polymer block (A) if more than one polymer block (A) is present, 5 or more and 100 or less.

4. The inverse gelling hydrogel in accordance with claim 3, wherein the number of repeating units of formula (I) forming each polymer block (A) is, independently for each polymer block (A) if more than one polymer block (A) is present, 10 or more and 70 or less.

5. The inverse gelling hydrogel in accordance with claim 1, wherein the structure of the polymer block (A) is represented by formula (Ia):

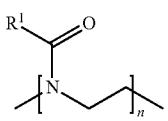

(Ia)

wherein R¹ is methyl or ethyl, and n is 5 or more and 100 or less.

6. The inverse gelling hydrogel in accordance with claim 1, wherein the number of repeating units of formula (II) forming each polymer block (B) is, independently for each polymer block (B) if more than one polymer block (B) is present, 5 or more and 100 or less.

7. The inverse gelling hydrogel in accordance with claim 6, wherein the number of repeating units of formula (II) forming each polymer block (B) is, independently for each polymer block (B) if more than one polymer block (B) is present, 5 or more and 70 or less.

8. The inverse gelling hydrogel in accordance with claim 7, wherein the number of repeating units of formula (II) forming each polymer block (B) is, independently for each polymer block (B) if more than one polymer block (B) is present, 10 or more and 33 or less.

9. The inverse gelling hydrogel in accordance with claim 1, wherein the structure of the polymer block (B) is represented by formula (IIa):

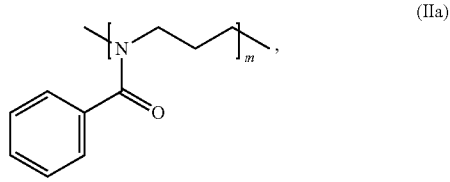

(IIa)

wherein m is 5 or more and 100 or less.

10. The inverse gelling hydrogel in accordance with claim 1, which is a triblock copolymer having the structure (A)-(B)-(A).

11. The inverse gelling hydrogel in accordance with claim 1, wherein the total number of repeating units in the block copolymer is in the range of 40 to 180.

12. The inverse gelling hydrogel in accordance with claim 1, wherein the ratio of the total number of repeating units of formula (I) forming the polymer block(s) (A) to the total number of repeating units of formula (II) forming the polymer block(s) (B) in terms of the numbers of repeating units, is in the range of 20:1 to 1:1.

13. A process for the formation of a hydrogel, comprising the step of cooling an aqueous solution of the block copolymer in accordance with claim 1 to a temperature of 20° C. or less.

14. The process in accordance with claim 13, wherein the aqueous solution of the block copolymer is cooled to a temperature of 15° C. or less.

15. The process in accordance with claim 13, wherein the aqueous solution comprises the block copolymer at a concentration of 3 wt % to 40 wt %, based on the total weight of the solution as 100 wt %.

16. The process in accordance with claim 15, wherein the aqueous solution comprises the block copolymer at a concentration of 5 wt % to 30 wt %, based on the total weight of the solution as 100 wt %.

17. A method for 3D printing, wherein the inverse gelling hydrogel in accordance with claim 1 is printed as a support material.

18. A method for transporting a sensitive material, wherein the inverse gelling hydrogel in accordance with claim 1 is used as a matrix for the sensitive material.

* * * * *